June 15, 1948. J. R. CORNELIUS 2,443,228
OPERATION AND CONTROL OF CHANGE SPEED MECHANISM
Filed Oct. 7, 1943 5 Sheets-Sheet 1

June 15, 1948.     J. R. CORNELIUS     2,443,228
OPERATION AND CONTROL OF CHANGE SPEED MECHANISM
Filed Oct. 7, 1943     5 Sheets-Sheet 3

Inventor
James R. Cornelius
by Babcock & Babcock
Attorneys

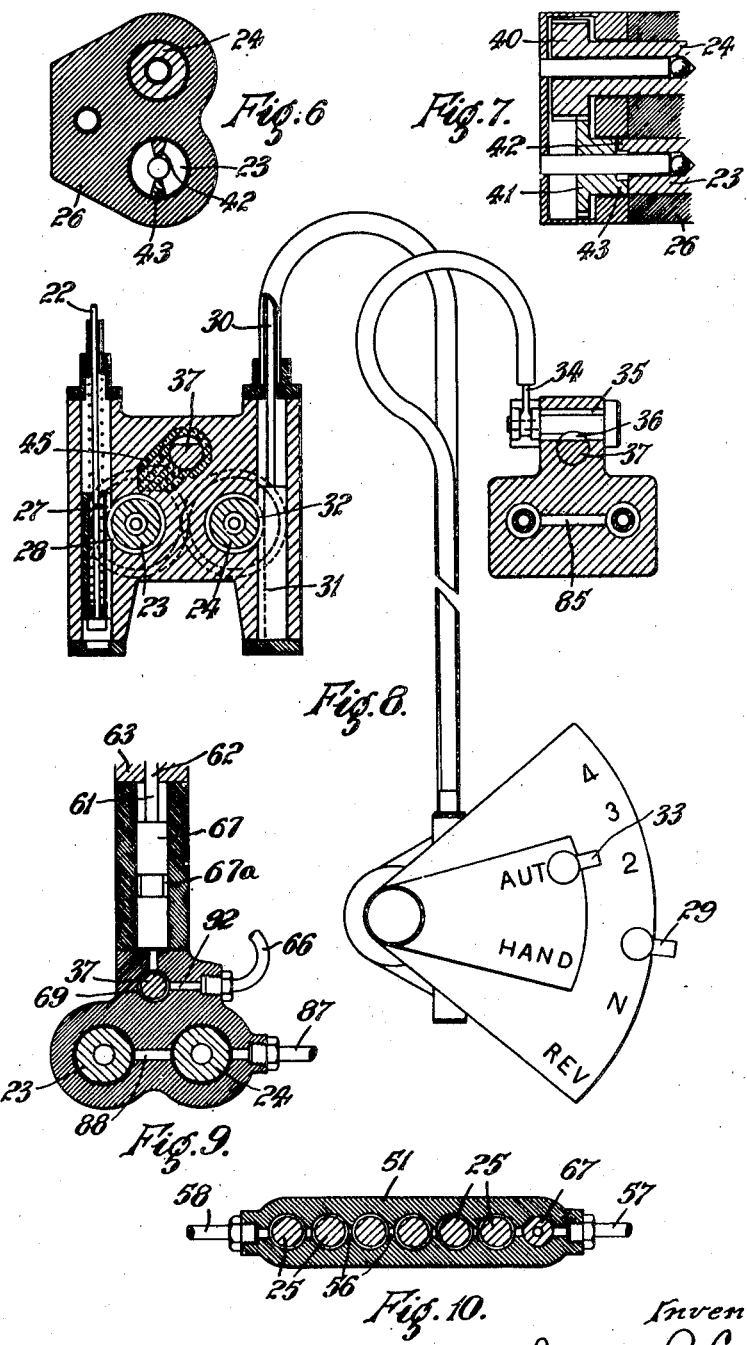

Patented June 15, 1948

2,443,228

UNITED STATES PATENT OFFICE 2,443,228

OPERATION AND CONTROL OF CHANGE-SPEED MECHANISM

James Richard Cornelius, Coventry, England

Application October 7, 1943, Serial No. 505,338
In Great Britain March 4, 1943

6 Claims. (Cl. 74—335)

This invention relates to change speed mechanisms for use in cases where it is desirable to provide automatic control of the ratio of the angular speeds of the input and output shafts of a gear box or other variable speed mechanism.

An object of this invention is to provide a selective system of speed control in which the speed and torque of the prime mover and the load to be overcome are employed in combination to select and engage the optimum gear ratio.

A further object of the invention is to provide means whereby the variable speed mechanism, when adapted for automatic ratio selection, may be manually operated when so desired, or the range of automatic operation curtailed to suit prevailing conditions, such as for controlling the speed of a motor vehicle when in reverse or in difficult manoeuvering positions.

According to the invention the improved system consists in utilising the variations in the torque applied on the output shaft of the change speed mechanism to effect the automatic selection and engagement of the speed thereof most suitable for the load and other conditions prevailing at any given time.

Briefly, the invention comprises a torque responsive unit (hereinafter referred to as the torque converter) that indicates mechanically the variation in the load applied to the output shaft of the change speed gear, a hydraulic system that generates a definite pressure of fluid for a given horsepower output of the prime mover, and a system of hydraulically operated valves and selection pistons for selecting the correct gear ratio and engaging the gear members appropriate therefor. For the reasons above stated, it is also preferred to provide means whereby the selection of the various speeds can be manually controlled.

In order that the invention may be clearly understood and readily carried into practical effect reference is made in describing the same to the accompanying drawings, which show the invention as applied by way of example, to the orthodox type of transmission gear for automobiles employing a gear box of the synchro-mesh or "crash" types:

Figure 6 is a transverse sectional view on the line VI—VI of Figure 3.

Figure 7 is a detail view in horizontal section on the line VII—VII of Figure 3.

Figure 8 is a transverse sectional view of the control device.

Figure 9 is a view in transverse vertical section on the line IX—IX of Figure 3.

Figure 10 is a horizontal transverse section on the line X—X of Figure 3.

Figure 1:
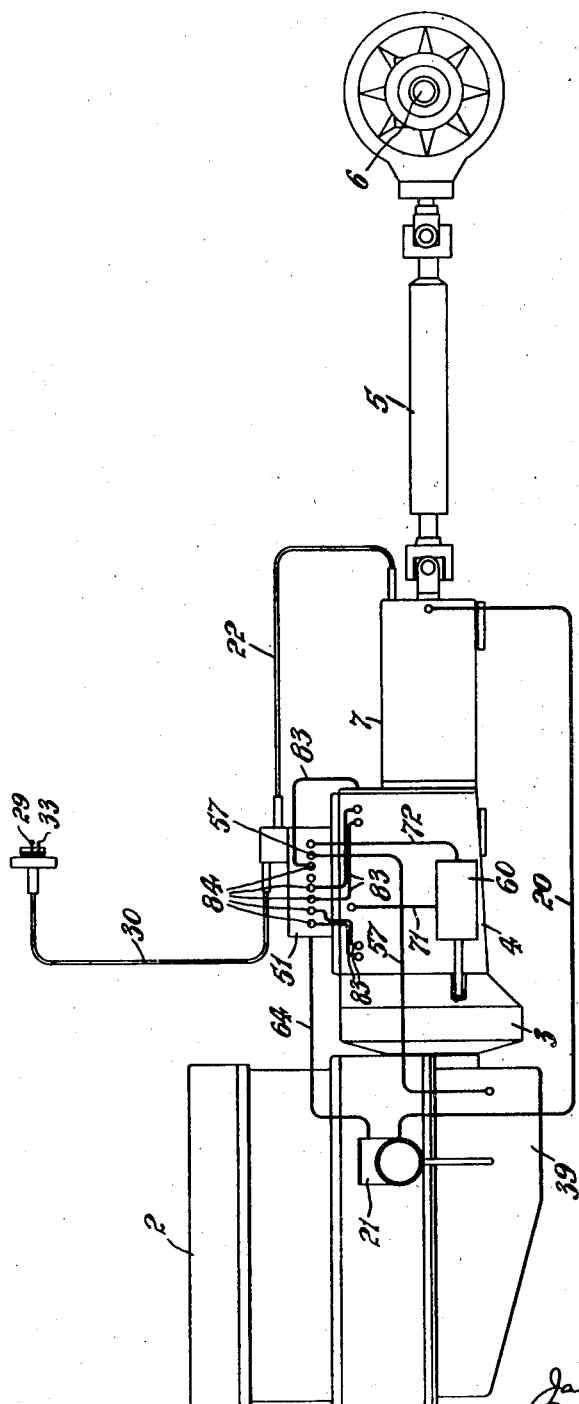
Figure 1 is a diagrammatic view in side elevation of the complete lay-out.
Figure 2:
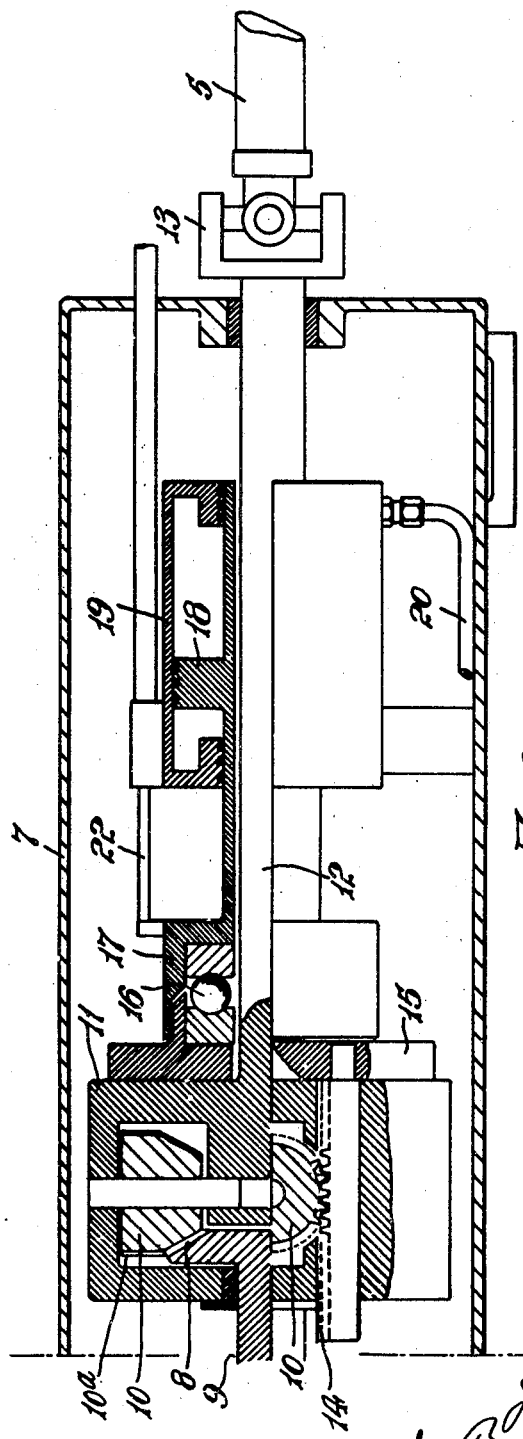
Figure 2 is a longitudinal sectional view on a larger scale of one form of the torque converter.

Referring to Figure 1 of the accompanying drawings, 2 represents the engine or prime mover of an automobile, 3 the clutch, 4 the gear box, 5 the propeller shaft, and 6 the back axle or final drive. Between the gear box and the propeller shaft is the torque converting unit which is enclosed in the casing 7, and, as shown in Figure 2, comprises planetary and rack gears and a hydraulic cylinder. The sun wheel 8 of the planetary gear is secured to or formed integral with the output shaft 9 of the gear box, whilst the planet pinions 10, the teeth of which have parallel portions 10ª, are rotatably mounted in a housing 11 secured to or formed solid with a shaft 12 which is connected with the propeller shaft 5 by means of a universal joint 13. The said pinions besides being in constant mesh with the sun wheel 8 are also each in constant mesh by their parallel portions 10ª with a rack 14 slidably mounted in the said housing 11. The said racks are fixed at one end to a plate 15 which is in abutting relationship through a ball thrust bearing 16 with the outer end 17 of the piston 18 of a hydraulic cylinder 19 co-axially arranged with respect to the shaft 12. The said cylinder is supplied through the pipe 20 with fluid under pressure from a pump 21, Figure 1, driven by the engine or prime mover. The fluid pressure acting on the piston is, therefore, at all times proportional to the speed of the engine.

From the foregoing it will be seen that for any variation in torque in shafts 9 and 12 a variation in pressure is produced in cylinder 19 and that any variation in this pressure can be used as an index for the torque that is being transmitted, provided, of course, that the horsepower input to shaft 9 is constant. It will also be appreciated that the torque imposed on shaft 12 will vary with the speed obtained through the gear box. For any constant speed of shaft 12 obtained through the gear box the pressure of the fluid in the cylinder 19 will increase with the speed ratio of shaft 9 and prime mover. From this it follows that since the fluid pressure on piston 18 varies with the speed of the prime mover it will be possible by a suitable selection of speed ratio in the gear box to obtain an optimum position in which the pressure on said piston will balance the load applied by the said planetary and rack gear of the torque converting unit. Under these conditions the piston 18 can be regarded as floating axially in the cylinder 19, its position at any moment being dependent on the pressure whether this is created by the action of the planetary and rack gears or by the fluid pressure from the engine driven pump 21.

The movement of the said piston is utilised according to this invention to control the selection and engagement of the gear couples in the gear box most appropriate for the prevailing load conditions and thereby restoring equilibrium between the forces acting on the piston 18.

In some cases, as in the present instance, it is advisable, for the proposes of controlling the speed of a car when in reverse gear, or in difficult maneuvering positions, to incorporate with the automatic torque controlled system some provision for manual control. In the construction hereinafter described this involves the provision of two valves 23, 24 for controlling the distribution of fluid pressure from the pump 21, or from a separate pump operating at a constant speed, to a series of selector pistons 25, Figure 3, controlling the selective admission of the fluid pressure to hydraulic mechanisms, one of which is associated with the clutch and the other with the gear box. These two halves 23, 24 are both of hollow cylindrical form and rotatably mounted on parallel axes in a valve box 26, as shown in Figures 3, 4, 6, 7, 8 and 9. Of these two valves 23 is adapted for automatic operation for which purpose it is connected with the outer end of the piston 18 by means of a cable 22 the other end of which is attached to a spring-loaded rack 27, in constant mesh with a gear wheel 28 fixed to the valve 23, as shown in Figure 8. The other valve 24 is adapted for manual operation by means of a hand lever 29 which is connected by a cable 30 with a rack 31 in constant mesh with a gear wheel 32 fixed to this valve as shown in Figure 8. The transition from automatic to manual control is effected by means of hand lever 33 which is connected by means of a cable 34 to a gear pinion 35 in constant mesh with a rack 36 on a sliding control valve 37 arranged parallel with the valves 23, 24 and between them and the selector pistons 25, as shown in Figures 3, 4, 8 and 9.

Figures 3, 4:
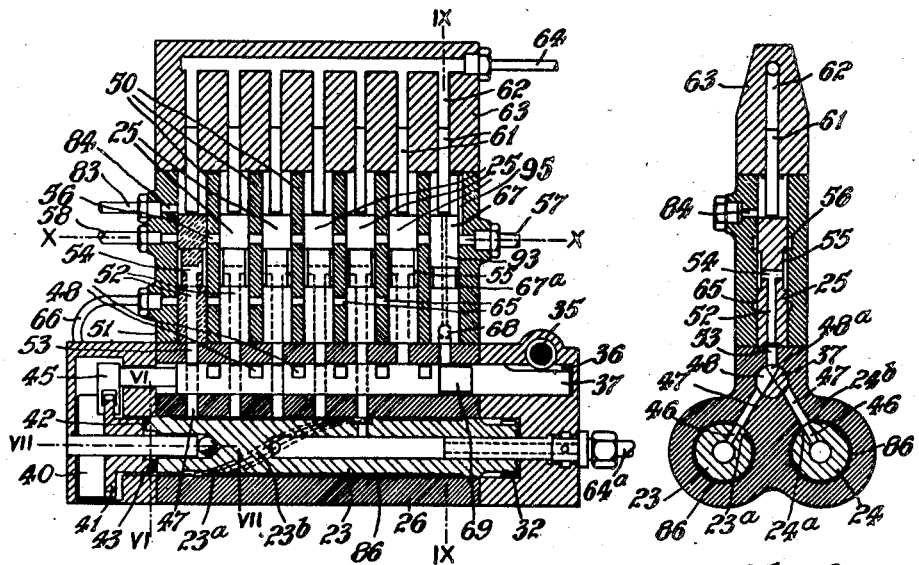
Figure 3 is a vertical sectional view of the hydraulic valve gear.
Figure 4 is a transverse sectional view thereof.

In the position shown in the drawings the valves 23 and 24 are set for automatic control in which position they are geared together as shown in Figures 3 and 7 where it will be seen that whereas the gear wheel 40 is formed integral with valve 24 and is wide of tooth, the gear wheel 41 is narrow of tooth and has, moreover, a clutch connection with valve 23 by means of the co-operating projections 42, 43. When the sliding valve 37 is moved towards the left-hand for manual control by means of hand lever 33 the gear wheel 41 is moved out of clutch engagement with valve 23 by means of a fork 45 on the left hand end of the sliding valve 37.

The two distributing valves are each provided with a helical sealing face 23ª, 24ª having a channel 23ᵇ, 24ᵇ cut in its length, said channel communicating with the interior of the valve by means of port 46, Figure 4. Selective communication between each distributing valve and the sliding valve 37 is by means of ports 47 in the valve box which register with one of two series of cut-away parts 48, 48ª of the sliding valve.

The selector pistons 25 work in cylinders 50 formed in a block 51 which is mounted on the valve box. Each piston is formed with a centrol hole 52 which registers at the bottom with one of a series of ports 53 communicating with the sliding valve 37. The upper end of this hole terminates in two lateral ports 54 which open into an annular space 55 formed by a reduced part of the piston. All the cylinders 50 for the pistons 25 are in open communication with each other by means of a line of ports 56, Figure 3, one end of the line being connected by pipe 57 with the sump 39 and the other end by the pipe 58 with a cylinder 60 associated with the engine clutch, Figure 11. The said pistons 25 are normally maintained in their lowest or inoperative positions shown by means of a series of plungers 61 working in holes 62 in an upper block 63, said holes being in communication with fluid pressure from the pump 21 aforesaid by the pipe line 64, or from a separate pump driven at constant speed.

The cylinders 50 are also in open communication by means of another line of ports 65 with a pipe 66 leading to a piston 67 via an annular recess 69 in the sliding valve 37.

Figure 11:
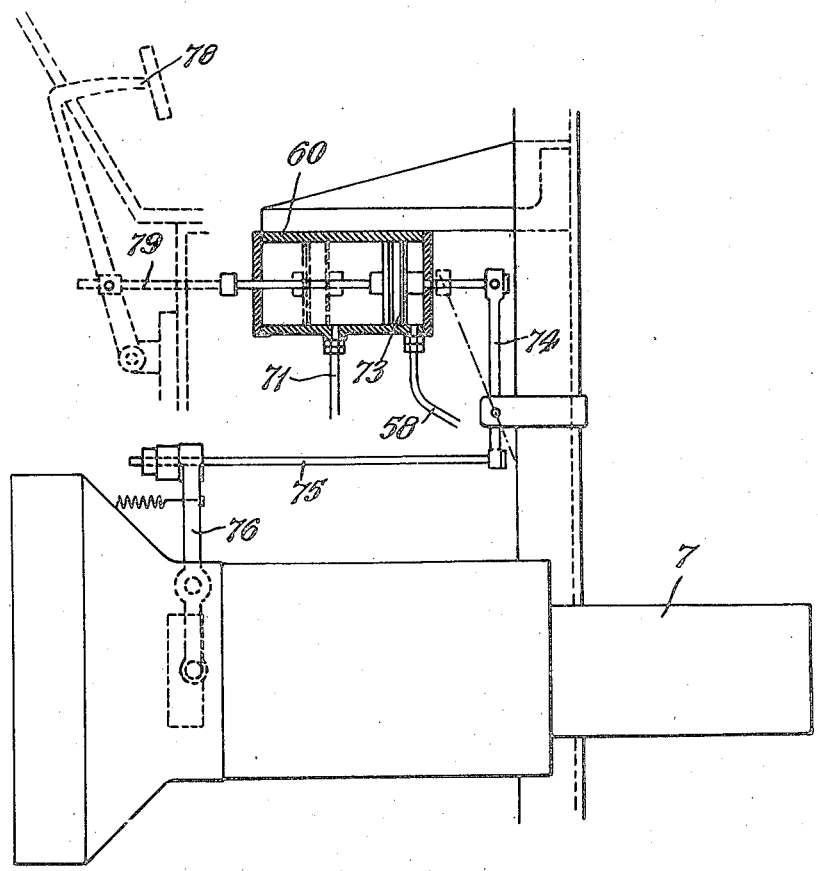
Figure 11 shows the hydraulically operated clutch mechanism.

The automatic clutch operating mechanism is shown in Figure 11 as comprising the hydraulic cylinder 60 aforesaid which is connected by pipe 58 with the auto-selector port 56 and by means of pipes 71 with the cylinders 59 for the neutralising pistons 72 in the gear box. The clutch operating piston 73 is connected by means of a rocking lever 74, connecting rod 75 and fork 76 with the usual spring-loaded movable member of the clutch. For the purposes of manual control the said piston 73 is also connected with the usual clutch pedal 78 by means of an extended piston rod 79.

Figure 5:
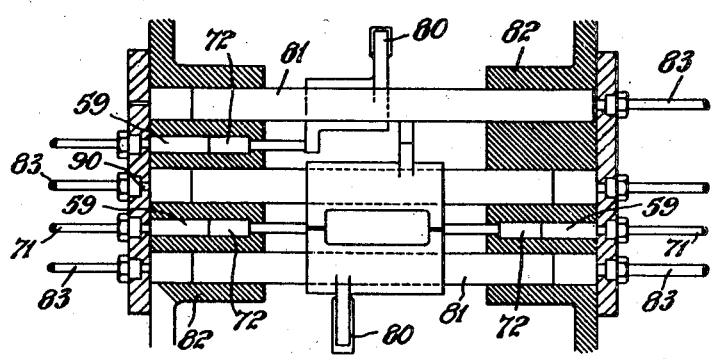
Figure 5 is a longitudinal sectional view of the hydraulically operated gear selectors.

The striking gear for the gear box is shown in Figure 5. The striking forks 80 operating the gears are fixed to pistons 81, the cylinders 82 of which are connected by means of pipes 83 with the ports 84 communicating with the cylinders 50 of the selector pistons 25. The said forks are also subject to the action of the neutralising pistons 72 working in cylinders 59 connected by means of pipes 71 via the clutch-operating cylinder 60 and pipe 58 with the line of ports 56. In the position shown, the system is set for automatic operation, the hand lever 33 being in the position shown in Figure 8.

Assuming the engine to be in motion fluid pressure is supplied from the pump 21 by means of the pipe 20 to the cylinder 19 of the torque converter and to the connections 64 and the hereinafter referred to connection 64ª of the selector unit. In the former the pressure is low until the engine speed is accelerated to cause an increase in horsepower sufficient to take up the drive required. Piston 18 then moves to the left-hand and in doing so (since there is no re-action, the gear box being in neutral) causes the cable 22 to operate the rack 27, Figure 8, until the valve 23 has rotated sufficiently for the channel 23ᵇ in the helical seating 23ª to supply fluid under pressure to the first port 53 via the sliding valve 37. The piston 25 of the cylinder connected with this port is lifted under the influence of the fluid pressure supplied at 64ª to the interior of the valve 23. The said piston as it rises first uncovers port 56 which permits fluid pressure to pass via pipe 58 communicating with the clutch-operating cylinder 60, Figure 11, thereby withdrawing the clutch. As soon as the clutch is disengaged this pressure is by-passed by the piston 73 to the pipe 71 leading to the cylinders 59 of the neutralising pistons 72 of the gear box and ensures that all the gears are in the neutral position.

Meanwhile the piston 25 is still rising in its cylinder and uncovering the port 84 thereby permitting fluid pressure to pass via pipe 83 to the piston 81 in the gear box controlling the engagement of the low speed gear. The clutch being still disengaged this engagement of the low speed gear takes place under no load. The piston 25 still rising next uncovers port 65 and the fluid is now diverted along the pipe 66 to the bottom of piston 67 which is thereby caused to rise and uncover port 57 by the annular groove 67a thereby permitting the pressure in pipe 58 to drop to atmospheric, port 57 being connected with the sump 39. This allows the clutch to re-engage under the influence of its springs and re-establish a driving connection between the engine and the gear box. Meanwhile equilibrium is being sought between piston 18 and sun wheel 8. If the load is too great at bottom speed the engine must be accelerated otherwise the engaged gears will be automatically disengaged by the action of the neutralising pistons associated therewith. Acceleration of the engine, however, will cause a movement of the piston 18 towards the left-hand owing to the increase in the fluid pressure behind it from the pump 21, and one by one the gears in the gear box will be engaged until the load becomes greater than the available torque when a reversal will take place, that is to say, a lower gear will be automatically selected and engaged until equilibrium is again established between the piston 18 and the fluid pressure acting thereon.

When manual operation is required the hand lever 33 is moved to the position marked "Hand", on its associated quadrant. This movement is communicated by the cable 34 to the pinion 35 which by its engagement with the rack 36 moves the sliding control valve 37, Figure 3, towards the left-hand thereby disengaging the clutch connection between valve 23 and the gear member 41 by means of the fork 45. With the control valve 37 in this position the valve 23 will be inoperative, any pressure in pipe line 64a will now be directed to pistons 25, via helical channel 24b in valve 24 since the ports 48a in control valve 37 will now be in communication with ports 46 in valve 24. The rotary motion required for valve 24 is obtained manually by moving the hand lever 29 along its quadrant which for a four speed gear box will be engraved for six positions, as shown in Figure 8. Movement of the said lever is transmitted by the cable 30 to a rack 31 engaging the gear member 32 on valve 24, see Figure 8. The valve 24 has its helical sealing face 24a and channel 24b communicating with connection 64a via the interior of valve 23 and a connecting passage 85 between the two valves, see Figure 8.

It is not possible for any two of pistons 25 to be subject to pressure from below at the same time. Both valves 23 and 24 are formed with a reduced diameter between their ends leaving a space 86 so that immediately either of the helical channels 23b, 24b are no longer supplying pressure to any of the ports 53, the said space connects those ports with the pipeline 87, Figure 9, leading to the sump 39, either directly for valve 24, or via port 88 for valve 23.

The method of engaging the selected gear by hand operation is similar to that used for automatic selection. With the engine running and the clutch 3 engaged it can be assumed that the hand lever 29 is in the neutral position N, Figure 8, so that the gear box is inoperative. If now the said lever is moved to the bottom gear position shown in Figure 8, the valve 24 will have been rotated to an angular position such that the helical sealing face 24a and groove 24b will move from the position represented in Figure 3, which illustrates the neutral piston 25 under control, to connect the adjacent piston 25 to the left with the pressure line 64a. Fluid under pressure, therefore, enters port 53 beneath this piston and causes it to rise pushing the plunger 61 associated with it. Groove 55 in piston 25 first uncovers port 56 and permits fluid under pressure to flow through the line of ports 56 to pipe line 58 whence it is conducted to the cylinder 60 of the clutch operating piston 73, Figure 11, by way of pipe 58. The resulting left-hand movement of this piston acting through the lever 74, rod 75 and fork 76 disengages the clutch, and at the same time by-passes the fluid through pipe 71 to the cylinders of the neutralising pistons 72 in the gear box causing them to disengage any gears that may have been in mesh. In the position shown in Figure 5 the gears are all withdrawn to the neutral position automatically. Meanwhile piston 25 is still being forced upwardly and the groove 55 therein next connects port 84 with the pressure fluid. This port, as shown in Figures 3 and 5, is connected directly by pipe 83 to port 90 in the gear box so that the pressure fluid is directed to the face of piston 81 operating the slider for the first or bottom gear, which is engaged ready to take the drive immediately the clutch is re-engaged. Piston 25, however, continues to rise and finally connects port 65 to the pressure fluid as the lower face of the piston 25 passes this port. Port 65 is connected by pipe 66 to port 92, Figure 9, and thence to the annular space 69. From this space it passes direct to the underside of the piston 67 via the bleeder or trickle valve 68. Piston 67 now rises until the annular groove 67a therein connects the line of port 56, Figures 3 and 10, with the pipe 57 which is connected with the sump 39 and atmospheric pressure. The pressure in line 58 therefore drops to zero and the clutch in consequence is re-engaged under the influence of its springs to take up the drive. Since pressure is continued under the selected piston 25 the fluid will continue to flow therefrom via port 65 and pipe 66 to the bottom of piston 67 and thence past the trickle valve 68, hole 93 and groove 95 to the sump by way of the pipe 57. There is, therefore no sustained pressure in the system. Immediately valve 24 is rotated to another position by the hand lever 29, however, the helical channel 24b is sealed and pressure builds up in the system to operate another piston. The released piston is no longer controlled as the port 53 is opened to the space 86, permitting the pressure re-setting plunger 61 to push piston 25 back to its bottom position. Piston 67 is still at the top of its stroke and the pipe 66 is blocked by pistons 25 which do not permit the trapped fluid to escape via the ports 53 and the space 86. Piston 67, however, has a central hole 93 controlled by a trickle valve 68 which permits a slight escape of fluid through said hole. Plunger 61 by its action presses piston 67 downwards and causes a pressure to be exerted on the trapped fluid which escapes past the valve 68 as the piston 67 descends. The fluid thus escaping collects on the top of piston 67 and is evacuated to the sump together with any leakage from pistons 25 by way of the intercommunicating upper ends of the cylinders 50 and the groove 95 aforesaid, to the pipe 57.

As already stated the rack 27 by means of which valve 23 is rotated, as shown in Figure 8, is spring-loaded so that any movement of cable 22 to bring into operation pistons 25 from right to left is positive, whereas any operation of pistons 25 in the reverse order is elastic. By means of this arrangement the angular position of the gear member 41 carrying the projection or clutch tooth 43 can be adjusted about its axis and locked by lever 29. The angular position of the other projection or clutch tooth 42 with respect to the axis of valve 23 can be adjusted by cable 22 and rack 27. The positive movement will be clockwise for clutch tooth 42 but the anti-clockwise movement will be determined by the position of clutch tooth 43. Thus the valve 23 will be controlled so far as its rotational movement is concerned, by the degree of rotation of clutch tooth 43 which, as aforesaid, is controlled by the lever 29 so that by setting the latter in any desired position in relation to its quadrant (Figure 8) the effective operation of valve 23 and the range of gear ratios which can be automatically selected and engaged, can be limited.

As already stated, the construction and operation above described is for an orthodox type of gear box employing crash gears or some kind of synchro-mesh system to facilitate gear tooth engagement. With such a type of box a clutch is necessary and has been provided for. Where, however, permanently coupled gears are employed to transmit the drive and individual clutch members are fitted to each couple, the selection of any given ratio will not require the introduction of neutralising mechanism or a declutching device for isolating the gear box.

I claim:

1. A combined torque and speed responsive control unit for a variable speed gear box transmitting power from a prime mover to a gear box output shaft having two aligned coaxial sections and subjected to varying loads comprising, a relatively stationary hydraulic cylinder disposed coaxially about one of said shaft sections, a piston disposed coaxially about said shaft section for axial movement in said cylinder, and hydraulic means exerting a force against one side of said piston proportionate to the operating speed of said prime mover, in combination with mechanical means exerting a force against said piston proportionate to the torque imparted to said output shaft in opposition to the force exerted by said hydraulic means; said mechanical means comprising a sun gear carried by one of said shaft sections, a planet pinion carried by the other of said shaft sections in mesh with said sun gear, a rack associated with said pinion to receive linear movement responsive to rotary movement thereof, and means connecting said rack to said piston; and means governed by the axial position of said piston for controlling the selection of gear ratios in said gear box.

2. A combined torque and speed responsive control unit for a variable speed gear box transmitting power from a prime mover to the gear box output shaft, said shaft having two aligned coaxial sections and being subjected to varying loads, comprising, a relatively stationary hydraulic cylinder having its axis parallel to said output shaft, a piston disposed for axial movement in said cylinder, a pump supplying fluid to said cylinder on one side of said piston at a pressure proportionate to the operating speed of said prime mover, in combination with mechanical means exerting a force against said piston proportionate to the torque imparted to said output shaft in opposition to the force exerted by said hydraulic means; said mechanical means comprising a sun gear carried by one of said shaft sections, a planet pinion carried by the other of said shaft sections in mesh with said sun gear, a rack associated with said pinion to receive linear movement responsive to rotary movement thereof, and means connecting said rack to said piston to cause movement thereof; and means governed by the axial position of said piston for controlling the selection of gear ratios in said gear box.

3. A combined torque and speed responsive control unit for a variable speed gear box transmitting power from a prime mover to an output shaft for the gear box having two aligned coaxial sections and subjected to varying loads comprising, a relatively stationary hydraulic cylinder disposed coaxially about one of said shaft sections, a piston disposed coaxially about said shaft section for axial movement in said cylinder, and hydraulic means exerting a force against one side of said piston proportionate to the operating speed of said prime mover, in combination with mechanical means exerting a force against said piston proportionate to the torque imparted to said output shaft and in opposition to the force exerted by said hydraulic means, and means governed by the axial position of said piston for controlling the selection of gear ratios in said gear box.

4. A combined torque and speed responsive control unit for a variable speed gear box transmitting power from a prime mover to an output shaft subjected to varying loads comprising, a relatively stationary hydraulic cylinder disposed adjacent said shaft, a piston disposed for axial movement in said cylinder, and hydraulic means exerting a force against one side of said piston proportionate to the operating speed of said prime mover, in combination with mechanical means exerting a force against said piston proportionate to the torque imparted to said output shaft in opposition to the force exerted by said hydraulic means, and means governed by the axial position of said piston for controlling the selection of gear ratios in said gear box.

5. A combined torque and speed responsive control unit for a variable speed gear box which transmits power from a prime mover to a gear box output shaft subjected to varying loads comprising, a stationary cylinder, a piston disposed for axial movement in said cylinder, and fluid pressure means exerting a force against one side of said piston proportionate to the operating speed of said prime mover, in combination with mechanical means exerting a force against said piston proportionate to the torque imparted to said output shaft in opposition to the force exerted by said fluid pressure means, and means governed by the axial position of said piston for controlling the selection of gear ratios in said gear box.

6. A combined torque and speed responsive control unit for a variable speed gear box transmitting power from a prime mover to a gear box output shaft subjected to varying loads comprising, a stationary cylinder, a piston disposed for axial movement in said cylinder, and fluid pressure means exerting a force against one side of said piston proportionate to the operating speed of said prime mover, in combination with means exerting a force against said piston proportionate to the torque imparted to said output shaft and in opposition to the force exerted by said fluid pressure means.

JAMES RICHARD CORNELIUS.

REFERENCES CITED

The following references are of record in the file of this patent:

UNITED STATES PATENTS

| Number | Name | Date |
|---|---|---|
| 907,711 | Anthony | Dec. 29, 1908 |
| 1,587,645 | Hicguet | June 8, 1926 |
| 1,731,076 | Maurer | Oct. 8, 1929 |
| 1,805,120 | Von Erhardt | May 12, 1931 |
| 1,837,978 | McGavern | Dec. 22, 1931 |
| 1,838,096 | Fleischel | Dec. 29, 1931 |
| 2,008,231 | Vincent | July 16, 1935 |
| 2,019,146 | Livermore | Oct. 29, 1935 |
| 2,021,550 | Haycock et al. | Nov. 19, 1935 |
| 2,102,624 | Hopson | Dec. 21, 1937 |
| 2,161,008 | Bonn | June 6, 1939 |
| 2,189,680 | Sanford | Feb. 6, 1940 |
| 2,223,716 | Bojesen | Dec. 3, 1940 |
| 2,241,536 | Braden | May 13, 1941 |
| 2,243,321 | Smith | May 27, 1941 |
| 2,329,724 | Maurer | Sept. 21, 1943 |
| 2,352,212 | Lang et al. | June 27, 1944 |